March 14, 1972  M. ROBINSON ET AL  3,649,552
METHOD FOR PREPARING HIGH QUALITY RARE EARTH AND
ALKALINE EARTH FLUORIDE SINGLE CRYSTALS
Filed March 31, 1967  3 Sheets-Sheet 1

INVENTORS.
MORTON ROBINSON,
DONALD M. CRIPE,
BY
*[signature]*
ATTORNEY.

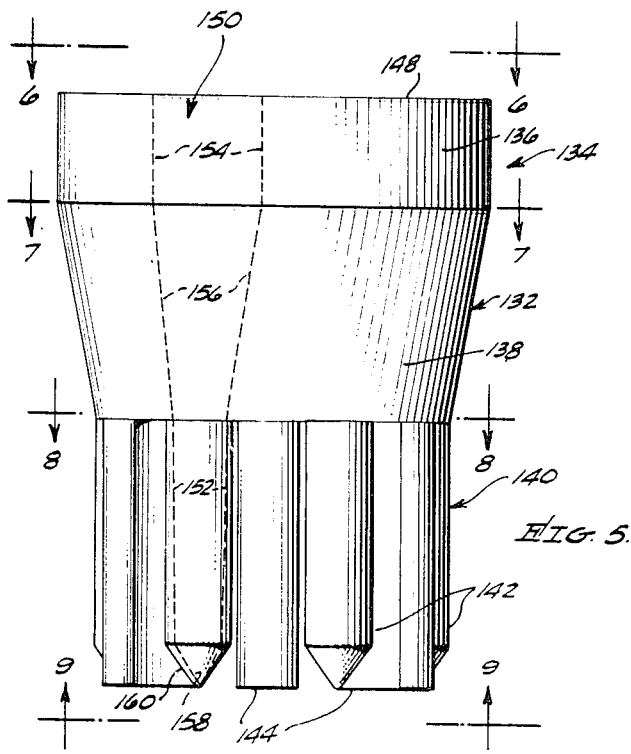
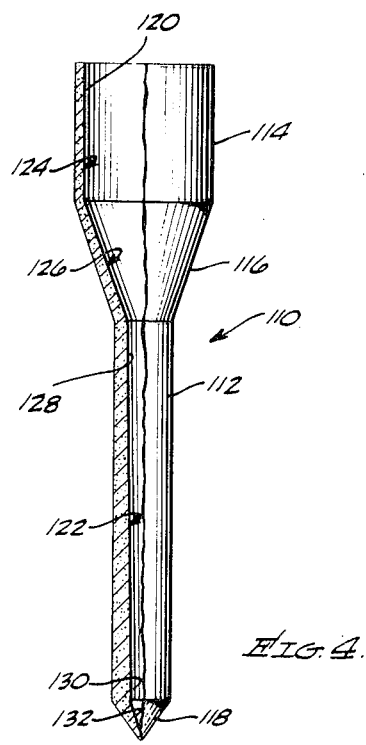
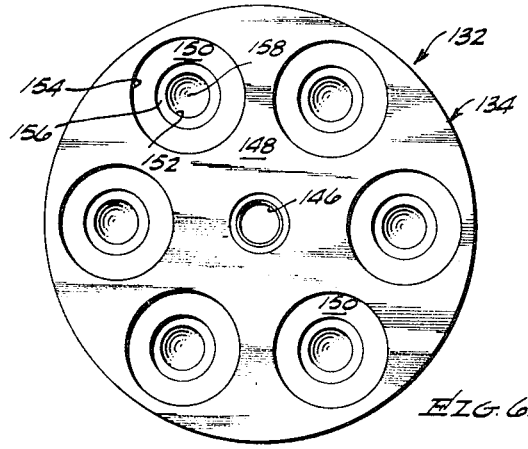
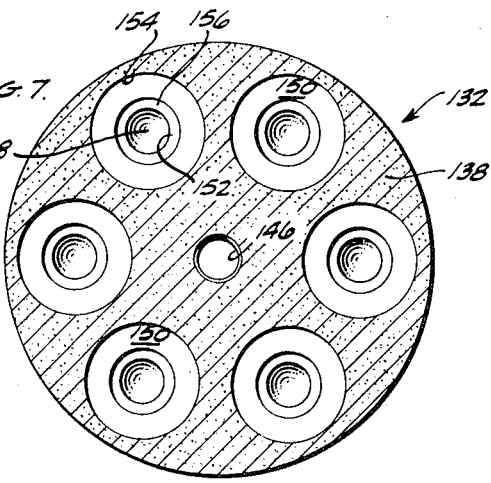
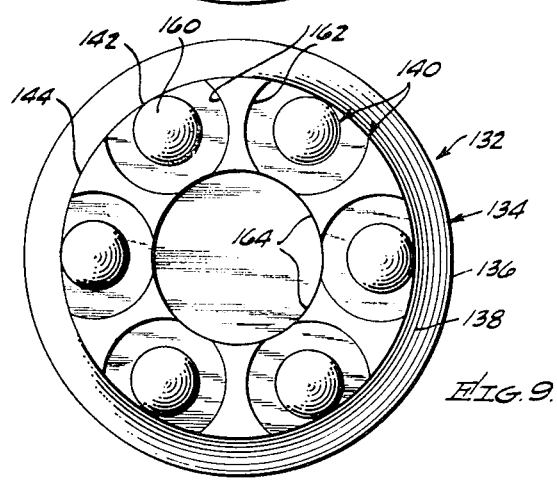

3,649,552
METHOD FOR PREPARING HIGH QUALITY RARE EARTH AND ALKALINE EARTH FLUORIDE SINGLE CRYSTALS
Morton Robinson, Granada Hills, and Donald M. Cripe, Santa Monica, Calif., assignors to Hughes Aircraft Company, Culver City, Calif.
Filed Mar. 31, 1967, Ser. No. 627,355
Int. Cl. C09k 1/04
U.S. Cl. 252—301.4       6 Claims

ABSTRACT OF THE DISCLOSURE

Laser quality crystals of alkaline earth and rare earth fluorides, including mixtures thereof, which are purified of oxides and oxyfluorides during crystal growth. Purification is effected by an ion-exchange technique and by reaction with hydrogen fluoride as a scavenger of oxide impurities primarily by means of a modified Stockbarger-type furnace. The melt in the furnace is subjected to HF gas throughout crystal growth to prevent hydrolysis caused by small quantities of water vapor in the HF/He atmosphere and/or generated by furnace outgassing. Purification methods have resulted in crystals transparent to 0.14 micron.

---

The present invention relates to a method and a crucible for preparing optically pure crystals of alkaline earth and rare earth fluorides, including mixed rare earth fluorides and mixed rare earth-alkaline earth fluorides, and, in particular, to such a method and crucible for preparing laser-quality crystals free from oxides and oxyfluorides.

Laser devices require the use of crystals which are of ultra-high optical purity since even minute impurities cause internal scatter and opaqueness in the crystal, thereby preventing the desired light amplification. In recent years, interest has centered on crystals doped with rare earths since the rare earths possess qualities which are well-suited for laser studies. However, optical-grade fluoride single crystals, especially rare earth fluoride single crystal hosts doped with rare earth ions, have been particularly difficult to grow and prior art methods (see, for example, J. Czochralski, Z. Physik Chem., vol. 92, p. 219 (1918); D. C. Stockbarger, Journal of the Optical Society of America, vol. 39, p. 731 (1949); H. Guggenheim, Journal of Applied Physics, vol. 34, No. 8, pp. 2482–2485, August 1963) have produced crystals which are deficient in several respects. Rare earth crystals grown by the Czochralski vertical-pulling method tend to be highly strained, even when special measures are taken for in-situ annealing. The Stockbarger method provides for fairly high quality crystals; however, these may also contain too great a percentage of impurity and the method is somewhat expensive and the crucibles are short-lived. Despite these refinements, crystals grown by prior methods frequently are partially opaque even when highly purified fluoride starting materials were used. Minute quantities of oxide present in the starting material precipitate during crystallization to cause internal scatter and, in extreme cases, to render the crystal completely opaque. In addition, where the ambient atmosphere during growth of the crystal comprised an inert gas, such as helium, the small amount of water vapor in the ambient atmosphere was sufficient to partially hydrolyze the rare-earth fluoride, resulting in an entirely unsuitable product for laser studies. For example, as small as 50 parts per million of oxide and/or oxyfluoride impurity is sufficient to render a crystal unsuitable for laser use. In fact, many crystals which are grown by prior methods and which are suitable for laser use contain sufficient impurities to give rise to misleading information with respect to the properties of the crystal. Thus, the standards obtained from such prior crystals may include inaccurate data.

A further difficulty experienced with prior art methods of growing crystals resides in the fact that only one crystal at a time could be grown. Because the growth of high quality crystals is markedly dependent upon temperature and uniformity of temperature within the crystal, the time for growing a single crystal encompassed a period of time which can easily extend from a few days to as much as a few weeks. Consequently, it has not been previously possible to obtain a large quantity production of crystals in the absence of a large number of furnaces in which the crystals may be grown. It is obvious, therefore, that the growth of a large number of crystals required a correspondingly large investment in process equipment.

Furthermore, the crucibles used in prior processes to form laser crystals were formed from platinum or platinum lined with carbon. When a platinum crucible is used, the formed crystal adheres to the platinum which requires that the crucible be torn away from the crystal so that the crystal may be obtained. Thus, such a crucible becomes unusable for further growth. When carbon is used as a liner for a platinum crucible and is exposed to hydrogen fluoride, a reaction occurs at elevated temperatures to cause a diffusion of the carbon through the platinum. The platinum becomes brittle although the fluoride crystal is not contaminated; however, the lifetime of the platinum with its carbon liner is shortened. Furthermore, many prior processes utilized a closed crucible in which the crystal material and ambient atmosphere are contained so that, if the ambient atmosphere included hydrogen fluoride, noxious fumes would not escape therefrom. However, when the crystal was formed, the crucible had to be destroyed in order to remove the crystal.

The present invention overcomes these and other problems by providing a very simple process wherein a multiplicity of laser quality crystals may be formed at the same time. Commercially obtained rare earth oxides are first purified and converted to their chlorides by means of an ion exchange technique to obtain a first purification of the rare earths through removal of impurities. The chloride of the particular rare earth obtained from the ion exchange technique is then precipitated as its oxalate and calcined at an elevated temperature to its oxide. The oxide is then reacted with hydrogen fluoride gas within a relatively low temperature furnace to form the fluoride. At this point, the rare earth fluoride is of very high purity; however, it may still contain minute impurities of oxide and oxyfluoride which would be, nevertheless, deleterious to the obtaining of a high quality crystal. The fluoridized material from the first furnace is in granule shape and, in order to reduce its volume and to further purify it, it is melted in a relatively high temperature crystal growing furnace in the presence of hydrogen fluoride. The purified resultant of the melt is polycrystalline in structure and serves as the starting material for crystal growth.

The polycrystalline starting material from the first melting step is then loaded into a crucible which is formed with an open end. The crucible and the polycrystalline starting material are attached to a lowering rod in the high temperature furnace and the temperature is slowly raised in an ambient atmosphere of pure helium to 50° C. above the melting point of the material to reduce the viscosity of the melt and to eliminate bubbles therein. A flow of hydrogen fluoride is initiated and dispersed throughout the interior of the furnace and is continued for a few hours while the crucible remains stationary and the temperature remains at 50° C. or higher above the material's melting point. The crucible is so constructed as to aid contact of the hydrogen fluoride with the melt, as will be described shortly. The crucible is then lowered at a rate commensurate with the growth rate of the crystal. At the end of the growth travel region, crystal annealing takes place. The time required for satisfactory annealing depends on the crystal material and the crucible material as well as the length of and diameter of the crystal. The crystal is slowly cooled to a specified temperature, the hydrogen fluoride flow is halted, and the furnace is cooled to room temperature over a period of approximately 24 hours.

One of several crucibles may be used to grow the fluoride crystals; however, all the crucibles are made from graphite since neither the melt nor the hydrogen fluoride atmosphere affects it. Other advantages of graphite are that the fluorides do not wet the graphite to facilitate removal of the crystal from the crucible and that the graphite is of sufficient mechanical stability so that no fine graphite materials are transferred as impurities to the crystal. The crucibles are formed with one or more ports so that one or more crystals may be grown singly or simultaneously. Each port is closed at its bottom end and open at its upper end. The diameter of each port is greatest at its open end and decreases toward its closed end where it terminates at a point to facilitate nucleation of a single crystal. The decreasing diameter, in conjunction with the non-wetting characteristic of graphite, permits easy removal of the crystal grown by means of the inventive process. The decreasing diameter also acts as a funnel to increase contact of the hydrogen fluoride with the melt. It is to be understood, however, that the graphite crucibles will facilitate removal of crystals regardless of the particular method of halide crystal growth employed.

Any suitable furnace may be used for crystal growth; however, the furnace is so constructed and arranged as to give a preferred temperature gradient of 50° C. per inch.

Other aims and objects, as well as a more complete understanding of the present invention will appear from the following explanation of an exemplary embodiment and the accompanying drawings thereof, in which:

FIG. 4 is a side elevational view, partly in section, of a single port crucible for growing a single crystal;

FIG. 5 is a side elevational view of a multiport crucible for growing simultaneously several crystals;

FIG. 6 is a top view, taken along lines 6—6 of FIG. 5, of the multiport crucible;

FIG. 7 is a sectional view, taken along lines 7—7 of FIG. 5, of the multiport crucible;

FIG. 8 is a sectional view, taken along lines 8—8 of FIG. 5, of the multiport crystal;

FIG. 9 is a bottom view, taken along lines 9—9 of FIG. 5, of the multiport crucible;

Most commercially obtained rare earth oxides contain sufficient impurities which preclude their immediate use as laser crystal materials since the highest purity available of a particular rare earth oxide with respect to other rare earth oxides varies from 99.9 percent to 99.997 percent; however, non-rare earth impurities may amount to as much as 2 percent. Consequently, commercially obtained rare earth oxides are first purified by means of an ion-exchange technique similar to that developed at the Ames Laboratory of Iowa State University and described by J. E. Powell in "The Rare Earths," F. H. Spedding and A. H. Daane, editors, John Wiley & Sons, Inc., New York, 1961, pp. 55–73.

Figure 1:
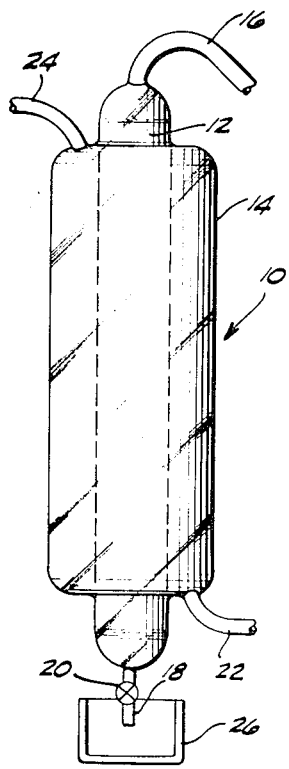
FIG. 1 is an elevational view of an ion exchange column used to purify commercially obtained rare earth oxide materials.

The apparatus employed for the initial purification includes an ion-exchange column 10 depicted in FIG. 1. Column 10 includes an inner chamber 12 and an outer jacket 14. An inlet 16 is secured to the top of chamber 12 and an outlet 18 with a stop cock 20 is provided at the lower end of the chamber. Jacket 14 surrounds chamber 12 and is provided with an inlet 22 and an outlet 24. A container 26 is placed beneath outlet 18 for collecting purified chlorides in solution when stop cock 20 is opened. Heated water is caused to flow through jacket 14 from inlet 22 to outlet 24 so that the temperature of the materials wtihin chamber 12 may be maintained at a temperature which enhances ion exchange. Inner chamber 12 is then packed with an ion-exchange resin, such as "1–X4 Dowex Anion Exchange Resin," trademark Dow Chemical Company, as described in Pat. 2,591,573.

Chamber 12 is first washed in 1 N hydrochloric acid and then with deionized water until the effluent pH is above 4. Approximately 200 grams of commercially obtained rare earth oxide is dissolved in 6 N hydrochloric acid, using as little excess acid as possible. The solution is diluted to four liters and added to the top of the column slowly. The column is then washed again with deionized water until the effluent pH is above 4.

A preferred solution of 0.015 molar diethylenetriamine penta acetic acid (DTPA) and ammonium hydroxide having a pH of approximately 8 is next added slowly (for example, at 30 milliliters per minute) to chamber 12 through inlet 16 to elute the rare earth oxide. Elution may also be accompanied by ethylene diamine tetra acetic acid (EDTA); however, the water in jacket 14 should be about 70° C. to prevent precipitation of the EDTA. The DTPA causes the rare earth ions and impurity ions to exchange between the resin phase and the aqueous phase whereupon bands of individual ions progress down chamber 12 at a rate governed by the affinities of the ions for the cation exchanger and their tendencies to form complex species with the DTPA elutant. At this point, the bands comprise chlorides of the rare earth and of the impurities.

Stop cock 20 is opened to draw off separate amounts (for example, twenty liters) of each rare earth chloride. Sufficiently small amounts or cuts are taken so that the desired rare earth chloride solution is divided up into several containers such as container 26. Since the middle cuts comprise the purist rare earth chloride, the remaining cuts are not used since they will contain an impermissible amount of impurity.

The effluent is then precipitated as a rare earth oxalate by the slow addition of saturated oxalic acid solution with constant stirring. The solids are filtered to obtain the rare earth oxalate which is then dried, placed in quartz trays and burned to the oxide in a furnace, for example, at a temperature of 900° C. for four hours.

Figure 2:
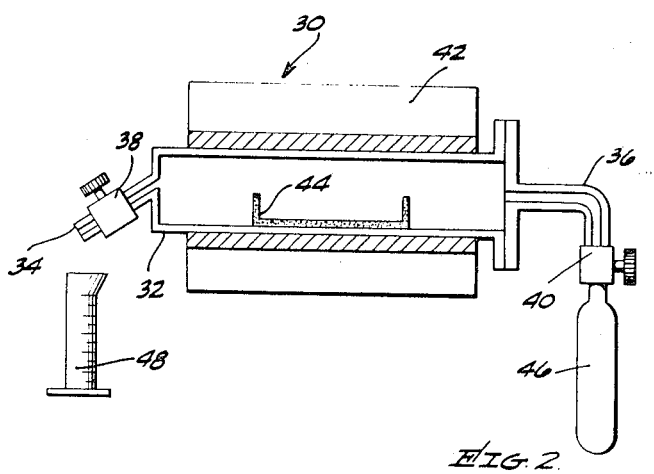
FIG. 2 is a view of the apparatus, including a furnace, for converting the purified rare earth oxides obtained by means of the FIG. 1 apparatus into rare earth fluorides.

The rare earth oxide is reacted with hydrogen fluoride gas to form a rare earth fluoride according to the following equation:

$$RE_2O_3 \text{ (s)} + 6HF \text{ (g)} \rightarrow 2REF_3 \text{ (s)} + H_2O \text{ (g)}$$

in the second step purification equipment shown in FIG. 2 and identified by numeral 30. It is to be understood that, if rare earth oxides of sufficient purity were available, equipment 30 would comprise the first step for purifying the rare earth oxides. The equipment comprises a stainless steel tube 32 which is provided with an outlet 34 at one end thereof and a hydrogen fluoride inlet 36 at the other end. A needle valve 38 is placed in outlet 34 and a second needle valve 40 is placed in inlet 36. A furnace 42 surrounds tube 32 and a platinum tray 44 is placed therewithin for reception of the rare earth oxide. A cylinder 46 filled with hydrogen fluoride is secured to inlet 36 through valve 40. A receptacle or graduate 48 is provided beneath outlet 34 in order to receive and measure some of the water produced by the reaction within furnace 42.

In operation, the rare earth oxide is loaded into tray 44. Valve 40 is closed and valve 38 is opened so that a pump may be secured to outlet 34 to evacuate the tube. During evacuation, the temperature of the furnace and the oxide therein is raised to about 700–800° C., thereby permitting any moisture in the oxide to be further removed and to create a partial vacuum within tube 32. Valve 38 is then closed, the pump is disconnected, and needle valve 40 is opened to allow hydrogen fluoride from cylinder 46 to expand into tube 32. After the pressure of the hydrogen fluoride from cylinder 46 has sufficiently filled evacuated tube 32, valve 38 is gradually opened until a small efflux of hydrogen fluoride is detected and valve 38 is left only slightly open to permit gaseous hydrogen fluoride to exist quasi-statically over the bed at a pressure which is greater than one atmosphere. The hydrogen fluoride gas reacts with the rare earth oxide as set forth in the above equation to convert the oxide into a rare earth fluoride and into water vapor. The vapor condenses at outlet 34 and drips into graduate 48. When the stoichiometric amount of water has collected in graduate 48, the conversion is completed. By means of the further purification step, only an excess of approximately 10 percent of hydrogen fluoride is used.

The rare earth fluoride or fluorides produced in equipment 30 of FIG. 2 is combined with a commercially obtainable pure alkaline earth fluoride or other rare earth fluorides in the proper amounts to form the desired laser crystal; however, it is to be understood that the alkaline earth fluorides may be purified further in a manner similar to that described above. At this point, both fluorides are in granular form. The mixture is first fused in a large crucible in the presence of a small partial pressure of hydrogen fluoride and helium to eliminate slight traces of rare earth oxyfluoride which may have remained from the step utilizing the equipment depicted in FIG. 2. This fusion step is preferably carried out in the equipment depicted in FIG. 3 which is also used later for the growth of the ultimate crystal. The fused polycrystalline starting material is then placed within a crystal growing crucible 50 which is smaller than the large crucible described above and the two are then placed within the interior 52 of a furnace 54 and held therein at the end of a rod 56. Preferably, both the rod and the crucible are formed from a compacted graphite which crucible will be described in greater detail hereinafter. A pair of plates 58 and 60 are secured at both ends of furnace 54 to enclose interior 52. An inlet 62 is provided in plate 58 for reception of rod 56 and to allow movement thereof. A gas inlet 64 communicates with interior 52 and an outlet 65 is formed in another opening in plate 58. The furnace is provided with heating elements to provide a temperature curve and gradient as depicted by curve 66. Curve 66 represents the temperature profile of the furnace having a maximum temperature portion 68 and lower portion 70. Maximum temperature portion 68 is at least 50° C. above the melting point of any of the laser crystals while lower portion 70 includes all crystallization temperatures at which the various laser crystals will solidify. Lower portion 70 has a preferred gradient of 50° C. per inch.

After the fused polycrystalline starting material has been loaded into crucible 50, rod 56 has been secured thereto, and the crucible and starting material have been placed and sealed within the interior of furnace 54, an ambient atmosphere of pure helium is provided within the furnace interior through inlet 64. The helium continues to flow and the temperature of the furnace is slowly raised to above (for example, to 50° C. above) the melting point of the polycrystalline fluoride material. A flow of hydrogen fluoride (for example, at 3 to 8 grams per hour) is then combined with the helium flow through inlet 64 in order to act as a scavenger of any water vapor or oxygen which may be present in the helium or outgassing of the furnace as the temperature is increased and of any oxides or oxyfluorides which may be present within the mixture of rare earth fluorides or alkaline earth rare earth fluorides. The temperature of the furnace is further increased (for example, to 75° C.) above the melting point of the mixture to lower the viscosity of the melt, to provide for complete mixing of the fluorides, and to remove bubbles therefrom.

After a sufficient time interval has passed during which the crucible remains stationary, the crucible is then slowly lowered through the furnace and the gradient at a rate commensurate with the rate of growth of the particular crystal. Drop rates of 2 to 12 mm./hour are satisfactory depending on the material to be grown, the type of crucible used, and the size of the crystal. At the end of the growth region, which occurs at some point of lower temperature portion 70, the crystal is annealed at approximately 1200–1300° C., the time required therefore being dependent upon the material, the construction of the crucible, and the dimensions of the crystal. The crystals are then slowly and partially cooled to approximately 1000° C., the hydrogen fluoride flow is halted and the furnace is cooled to room temperature over a period of twenty-four hours. The crystals are then removed from the crucible and ground into laser rods.

EXAMPLE

A laser crystal comprising 83.5 $CaF_2$:10 $ErF_3$:3$TmF_3$: 3 $YbF_3$: 0.5 $HoF_3$ was grown by means of the disclosed inventive method. For illustrative purposes, only the initial purification of $ErF_3$ will be described and it will be assumed that the other fluorides were obtained commercially or by means of the inventive process with sufficient purity for incorporation into the final growth step.

Commercially obtained erbium oxide of overall total purity of approximately 97% was the starting material. An ion exchange column 5 feet long by 3 inches inner diameter, as depicted in FIG. 1, was packed with 1–X4 Dowex Anion Exchange Resin. The packed column was first washed with 1 N HCl and then with deionized $H_2O$ until the effluent pH was above 4. Approximately 200 g. of $Er_2O_3$ was dissolved in 6 N HCl, using as little excess acid as possible. The solution was diluted to 4 liters and added to the top of the column at a rate of 100 milliliters/min. The column was then washed with water until the effluent pH was above 4.

The erbium oxide was next eluted with 0.015 molar DTPA solution which had been made up to pH $8 \pm 0.1$ with $NH_4OH$. The pH of the eluting solution was checked by comparing the color obtained with cresol red indicator with a set of LaMotte color standards prepared with the same indicator. The standards were checked at pH 8 with Coleman buffer tablets every few weeks, with no appreciable variance.

The elutant was run on the column at a rate of 30 milliliters/min. and the effluent was checked by addition of oxalic acid to detect when rare earth started to separate.

At this point, 5 gallon cuts were taken until tests showed that all of the rare earth had come through.

The effluent was poured into 4-liter beakers and the rare earth was precipitated by the slow addition of saturated oxalic acid solution, with constant stirring. The solids were filtered on No. 54 Whatman filter paper using a Gelman vacuum pump, which eliminates the necessity of having a water-vapor trap. The oxalate material was oven dried and placed on platinum foil in quartz trays, and then burned to the oxide in a furnace at 900° C. for 4 hours.

Ion exchange purification of the oxides of lanthanum, cerium, praseodymium, neodymium, gadolinium, dysprosium, holmium, erbium, thulium, and ytterbium had also been carried out using this technique. The 3-inch jacketed column worked out well; it not only gave sharper separations in most runs but prevented precipitation on the column of EDTA elutant, especially at times when room temperatures were high or lower than normal.

For converting rare earth oxides to fluorides, a tube such as depicted in FIG. 2 was evacuated by an aspirator pump through a valve of Monel (trademark of The International Nickel Company, Inc.). This valve was then closed off and the pump disconnected. The gas in the hydrogen fluoride cylinder was allowed to expand into the tube and the valve was gradually opened to a point where a small efflux of hydrogen fluoride could be detected. The hydrogen fluoride remained quasi-static over the oxide bed. The pressure of gaseous hydrogen fluoride over the bed was considerably greater than 1 atm., and the reaction proceeded fairly rapidly. As the reaction continued, the stiochiometric quantity of water was formed in accordance with the equation

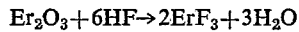
$$Er_2O_3 + 6HF \rightarrow 2ErF_3 + 3H_2O$$

The water condensed and dripped from the end of the tube to a graduated cylinder. When the last drop of water had formed, the reaction was complete, and only a slight excess of hydrogen fluoride had been consumed. The time required for conversion of a typical 100 g. batch was about 5 hours.

Considerable success has been achieved in the ultimate optical quality of rare earth trifluoride crystals through purification and preparation of starting materials and crystals growing techniques where the ultraviolet cutoff or transparency was as low as 1400 A.

Figure 3:
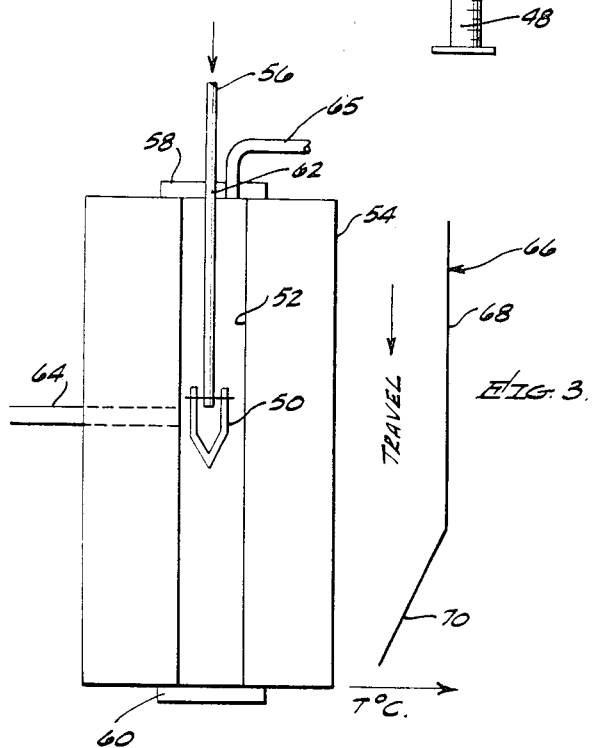
FIG. 3 is a schematic of a high temperature furnace used for crystal growth wherein the temperature gradient of the furnace is depicted alongside the furnace.
Figure 10:
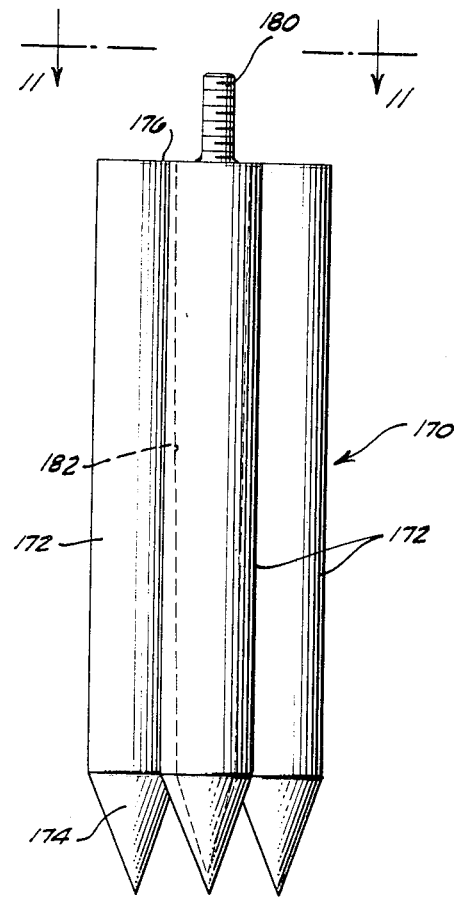
FIG. 10 is a side elevational view of a second multiport crucible for growing several crystals simultaneously.
Figure 11:
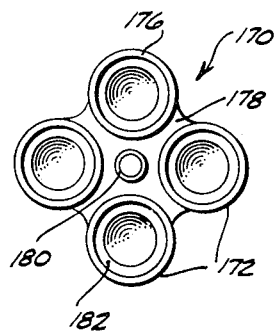
FIG. 11 is a view, taken along lines 11—11 of FIG. 10, of the second embodiment of the multiport crucible.

The technique for single crystal growth of 83.5 $CaF_2$: 10 $ErF_3$: 3 $TmF_3$: 3 $YbF_3$: 0.5 $HoF_3$ involved the use of a furnace specifically designed to contain a hydrogen fluoride atmosphere (FIG. 3). The graphite heating element gives a temperature gradient in the growth travel region of 50° C./in.

The sintered starting material in the above amounts was first fused at the melting point in either a cylindrical ultrapure graphite crucible or a vitreous carbon crucible in the presence of a small partial pressure of hydrogen fluoride in a helium atmosphere. This step eliminated slight traces of rare earth oxyfluoride (ROF) which may have remained from the sintering step. The oxyfluoride was eliminated according to the following reaction:

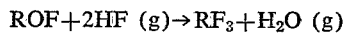
$$ROF + 2HF\ (g) \rightarrow RF_3 + H_2O\ (g)$$

The material obtained from the fusion process was then loaded into a graphite crucible which is conical at the tip, as depicted in FIG. 4. Preparatory to the growth process, the temperature was slowly increased to the melting point in a helium atmosphere, at which time a flow of hydrogen fluoride was started (5 to 8 g./hour). The temperature was further increased to 75° C. above the melting point; this lowers the viscosity of the melt to provide complete mixing of dopant and host, and removes bubbles.

Lowering rates of 2 to 12 mm./hour gave single crystals up to 2.5 inches long and ½ inch in diameter. When the crucible had traveled through the gradient, the lowering was halted and the crystal was annealed at 1200 to 1300° C. The hydrogen fluoride flow was halted and the crystal was cooled to room temperature over a 24 hour period.

The parameters necessary for growth of laser quality crystals included an axial furnace gradient of 50° C./in. used in conjunction with lowering rates of 2 to 12 mm./hour to yield crystals with better than a 95% survival probability after annealing.

Experiments were successfully conducted using multiport crucibles which yield more than one crystal per growth cycle (FIGS. 5–11). Utilizing the above techniques, the following single crystals are exemplary of the crystals obtainable by the invention: calcium fluoride singly and combined with fluorides of lanthanum, gadolinium, erbium, erbium-thulium, erbium-holmium, erbium-ytterbium-thulium-holmium, neodymium, and neodymium-ytterbium, holmium; cerium fluoride singly combined with fluorides of neodymium and praseodymium; praseodymium fluoride; neodymium fluoride; dysproium fluoride singly and combined fluorides of praseodymium; lanthanum fluoride singly and combined with fluorides of neodymium, praseodymium, eribium, cerium, ytterbium, terbium and thulium, prepared with various concentrations of ions to form doped crystals and crystals having an expanded lattice structure. The method was adjusted according to the particular melting points of the crystals.

The crystals fabricated by the above described method are preferably grown in one of the crucibles depicted in FIGS. 4–11. The crucibles are formed entirely from vitreous carbon or a compacted graphite since neither the corrosive nature of the melt nor the hydrogen fluoride atmosphere affects it. In addition, the fluorides do not wet the graphite, thus making the removal of the product quite easy. Furthermore, carbon has a melting point which is at least twice that of any of the crystals made by the inventive method and is insoluble therein. The graphite crucibles additionally have good thermal characteristics such that the heat of the furnace may be applied uniformly throughout the crystals during their growth. The graphite crucibles are relatively inexpensive, are easily machinable, and tend to resist shock. It is in part for these reasons that it is possible to form multipoint crucibles so that several crystals may be grown simultaneously.

A single port crucible 110 is depicted in FIG. 4 and comprises a tubular portion 112, an entry portion 114, and an intermediate portion 116. Tubular portion 112 terminates in a point 118 for closure thereof. The crucible is provided with a bore 120 which varies according to the particular portion to form inner walls 122, 124 and 126, respectively, of tubular portion 112, entry portion 114 and intermediate portion 116. Inner wall 122 of portion 112 is provided with a diameter at its upper end 128 which is greater than the diameter at its lower end 130. Thus, inner wall 122 tapers from its upper end to its lower end. Inner wall 132 of point 118 converges to a point from lower end 130 of portion 122 to serve as a nucleation point by which growth of a single crystal may be accomplished. Inner wall 124 of portion 114 is cylindrical and is provided with a diameter which is relatively larger than the diameter of walls 126 and 122. Inner wall 126 of portion 116 converges from inner wall 124 to the upper end 128 of inner wall 122 thus providing a gentle taper of bore 120.

Referring now to FIGS. 5–9, a multiport crucible 132 comprises a solid upper section 134, having an entry portion 136 and an intermediate portion 138, and a lower section 140 having tubular portions 142 and fins 144. Entry portion 136 is provided with an outer diameter which is greater than that of lower section 140 and intermediate portion 138 has an outer diameter which tapers from that of portion 136 to that of section 140. A tapped and internally threaded connecting means 146 is centrally disposed within entry portion 136 and crucible 132 and forms an opening in upper face 148 of portion 136. An externally threaded rod, such as rod 56 of FIG. 3, is adapted to threadedly engage crucible 132 within connecting means 146 to enable the positioning and movement of the multiport crucible within a crystal growing furnace.

As depicted in FIGS. 5–9, crucible 132 is adapted to permit simultaneous growth of six crystals in six individual components 150 of crucible 132. The internal construction of each component 150 is similar to that as illustrated with respect to FIG. 4 in such a manner that each tubular portion 142 is provided with an inner wall 152 which tapers from its upper end toward its lower end, entry portion 136 is provided with an inner cylindrical wall 154 and intermediate portion 138 is provided with a tapered inner wall 156 which joins inner wall 154 with the upper end of inner wall 152. The lower end of inner wall 152 converges to a nucleation point 158 within a point 160 of tubular portion 142.

Fins 144 extend downwardly from intermediate portion 138 and are formed with curved surfaces 162, as best seen in FIGS. 8 and 9, which are spaced from but concentric with tubular portion 142. Fins 144 are used to add support to crucible 132, to protect points 160 of tubular portions 142, and to prevent dissipation of heat from the tubular portions so that the growth and the stability of the crystals will be enhanced. A circular cutout 164, concentric with the axis of crucible 132, is placed interior to tubular portions 142 and fins 144 to permit even distribution of heat to the crystals during the time of their formation.

A third embodiment (see FIGS. 10 and 11) comprises a multiport crucible 170 including four tubular components 172 having pointed extremities 174 at one end thereof and entry portions 176 at the other extremity thereof. Components 172 are joined at their upper ends by a web 178 (see FIG. 11) and a threaded nipple 180 extends from web 178 for engagement with a rod, such as rod 56 of FIG. 3. The inner walls 182 of each of the tubular components 172 are similar to inner wall 122 of tubular portion 112, as depicted in FIG. 4.

In all cases, those inner walls which are in contact with the crystal are tapered in order to facilitate removal of the crystal after having been grown without necessitating the destruction of the crucible.

Although the invention has been described with reference to a particular embodiment thereof, it should be realized that various changes and modifications may be made therein without departing from the spirit and scope of the invention.

What is claimed is:

1. A method for growing a solid, optically pure, substantially one phase crystal from ultra pure polycrystalline calcium fluoride and rare earth fluoride materials within a sealable furnace having a gas inlet and a gas outlet and having a temperature profile provided with a maximum portion, a decreasing temperature gradient and a lower portion, comprising the steps of:
   loading the materials into a crucible having an open end and placing the loaded crucible in the furnace and sealing the furnace,
   exposing the materials and the interior of the sealed furnace to an ambient atmosphere of an inert gas flowing into the furnace through the gas inlet and flowing out of the furnace through the gas outlet,
   raising the temperature of the materials above the melting point thereof within the maximum portion of the temperature profile to form a melt from the materials,
   introducing a flow of hydrogen fluoride into the sealed furnace at a rate of at least 5 grams per hour to permit contact through the open end of the crucible between the hydrogen fluoride and the melt, the hydrogen fluoride flowing into the furnace through the gas inlet and flowing out of the furnace through the gas outlet,
   passing the crucible and melt through the decreasing temperature gradient of the temperature profile to solidify the melt into the crystal at a rate commensurate with the growth rate thereof while continuing the flow of the hydrogen fluoride,
   annealing the crystal at the lower temperature portion while continuing the flow of the hydrogen fluoride,
   shutting off the flow of hydrogen fluoride and cooling the furnace and crystal slowly to room temperature, and
   removing the crystal from the crucible.

2. A method as in claim 1 for growing several crystals further comprising the step of loading the materials into a multiport crucible.

3. A method for growing a solid, optically pure, substantially one phase crystal from calcium fluoride and rare-earth fluoride materials within an open, sealable furnace having a gas inlet and a gas outlet and having a temperature profile provided with a maximum portion, a decreasing temperature gradient and a lower portion, comprising the steps of:
   loading the materials into a crucible having an open end and placing the loaded crucible in the furnace and sealing the furnace,
   exposing the material and the interior of the sealed furnace to an ambient atmosphere of an inert gas flowing into the furnace through the gas inlet and flowing out of the furnace through the gas outlet,
   raising the temperature of the materials above the melting point thereof within the maximum portion of the temperature profile to form a melt from the materials,
   introducing a flow of hydrogen fluoride into the sealed furnace at a rate of 3 to 8 grams per hour to permit contact through the open end of the crucible between the hydrogen fluoride and the melt, the hydrogen fluoride flowing into the furnace through the gas inlet and flowing out of the furnace through the gas outlet.
   passing the crucible and melt through the decreasing temperature gradient to solidify the melt into the crystal at a rate of 2 to 12 millimeters per hour while continuing the flow of the hydrogen fluoride,
   annealing the crystal at the lower temperature profile portion while continuing the flow of the hydrogen fluoride,
   shutting off the flow of hydrogen fluoride and cooling the furnace and crystal slowly to room temperature, and
   removing the crystal from the crucible.

4. A method of growing a solid, optically pure, substantially single crystal from a charge of the group consisting of rare earth fluorides and alkaline earth metal fluorides and mixtures thereof, free from possible small amounts of an oxide impurity normally associated therewith, in a sealable furnace having a gas inlet and a gas outlet comprising the steps of:
   loading the charge into a crucible having an open end and placing the loaded crucible in the furnace;
   sealing the furnace and heating the charge within the furnace to a first temperature and for a period of time sufficient to provide a melt formed from the charge in an atmosphere at least including hydrogen fluoride continuously flowing from the gas inlet through the furnace and out of the gas outlet at a rate sufficient to remove the small amounts of the oxide impurity;
   slowly moving the melt at a controlled rate from a region at the first temperature and hotter than the solidification temperature of the melt to a region cooler than the solidification temperature of the melt and maintaining a temperature gradient between the regions near the boundary of solidification of the melt while continuing the flow of the hydrogen fluoride;
   thereby crystallizing the melt free from the impurity.

5. A method as in claim 4 wherein said heating step includes the step of maintaining the melt at the first temperature for a period of time sufficient to reduce the viscosity of the melt and to eliminate bubbles therefrom.

6. A method as in claim 4 further including the step of annealing the crystal after having solidified the melt in the region cooler than the solidification temperature.

References Cited

UNITED STATES PATENTS

| | | | |
|---|---|---|---|
| 3,114,601 | 12/1963 | Letter | 23—88 |
| 3,203,899 | 8/1965 | Fisher | 23—88 U |
| 3,282,641 | 11/1966 | Sfiligaj et al. | 23—88 |
| 3,219,585 | 11/1965 | Kaiser | 252—301.4 |
| 3,233,189 | 2/1966 | Guggenheim et al. | 252—301.4 X |
| 3,243,381 | 3/1966 | Yocum et al. | 252—301.4 |
| 3,453,215 | 7/1969 | Carnall et al. | 252—301.4 X |

OTHER REFERENCES

Spedding et al., "The Rare Earths," John Wiley & Sons, Inc., New York, 1961, pp. 79–82 and 86–87.

Guggenheim, "Journal of Applied Physics," vol. 34, August 1963, pp. 2482–2485.

HERBERT T. CARTER, Primary Examiner

U.S. Cl. X.R.

23—20, 21, 88, 304, 305